US010604190B2

United States Patent
Behnke et al.

(10) Patent No.: US 10,604,190 B2
(45) Date of Patent: Mar. 31, 2020

(54) CAB FOR AN AGRICULTURAL WORKING VEHICLE

(71) Applicant: CLAAS Selbstfahrende Erntemaschinen GmbH, Harsewinkel (DE)

(72) Inventors: Alexander Behnke, Rheda-Wiedenbrueck (DE); Markus Deppe, Halle/Westf. (DE); Florian Dannigkeit, Harsewinkel (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 84 days.

(21) Appl. No.: 15/980,089

(22) Filed: May 15, 2018

(65) Prior Publication Data
US 2019/0009826 A1    Jan. 10, 2019

(30) Foreign Application Priority Data

Jul. 6, 2017   (DE) ........................ 10 2017 115 126

(51) Int. Cl.
| | |
|---|---|
| *B60H 1/00* | (2006.01) |
| *B62D 25/06* | (2006.01) |
| *B62D 33/06* | (2006.01) |
| *B60H 1/32* | (2006.01) |
| *B62D 49/06* | (2006.01) |

(52) U.S. Cl.
CPC ......... *B62D 25/06* (2013.01); *B60H 1/00378* (2013.01); *B60H 1/3233* (2013.01); *B62D 33/0617* (2013.01); *B62D 49/06* (2013.01); *B60H 2001/00235* (2013.01)

(58) Field of Classification Search
CPC .... B62D 25/06; B62D 49/06; B62D 33/0617; B60H 1/00378; B60H 1/3233; B60H 2001/00235; B60K 11/06
USPC ................................ 296/190.1, 190.09, 210
See application file for complete search history.

(56) References Cited

U.S. PATENT DOCUMENTS

| | | | | |
|---|---|---|---|---|
| 4,641,502 A | * | 2/1987 | Aldrich | .............. B60H 1/00378 454/136 |
| 5,913,566 A | * | 6/1999 | Stauffer | ............. B60H 1/00378 296/190.1 |
| 6,178,612 B1 | * | 1/2001 | Gernstein | .............. B62D 33/06 29/401.1 |
| 6,279,978 B1 | * | 8/2001 | Schreyer | ................ B60H 1/247 296/190.03 |

(Continued)

FOREIGN PATENT DOCUMENTS

| | | |
|---|---|---|
| DE | 60309525 T2 | 10/2007 |
| EP | 0900718 A2 | 3/1999 |

(Continued)

OTHER PUBLICATIONS

European Search Report dated Aug. 17, 2018 (with English translation).

*Primary Examiner* — Pinel E Romain
(74) *Attorney, Agent, or Firm* — Collard & Roe, P.C.

(57) ABSTRACT

A cab for an agricultural working vehicle has a cab base, a cab body situated thereon and consisting of a frame structure, and a cab roof which comprises at least two shells. The cab roof is designed as a prefabricated module which can be placed onto the cab body.

7 Claims, 9 Drawing Sheets

(56) References Cited

U.S. PATENT DOCUMENTS

| | | | | |
|---|---|---|---|---|
| 6,719,361 B1* | 4/2004 | Adams | ............... | B62D 33/0612 296/190.01 |
| 6,773,056 B2* | 8/2004 | Fischer | ................. | B62D 33/06 296/190.08 |
| 6,780,097 B2* | 8/2004 | Shuttleworth | ..... | B60H 1/00378 454/136 |
| 6,883,860 B1* | 4/2005 | Budge | ................ | B62D 33/0612 296/190.02 |
| 7,334,834 B2* | 2/2008 | Hill | ................... | B60H 1/00378 296/190.09 |
| 8,944,199 B2* | 2/2015 | Fukunaga | ............. | B60K 11/06 180/68.5 |
| 9,550,407 B2* | 1/2017 | Gielda | ............... | B60H 1/00207 |

FOREIGN PATENT DOCUMENTS

| | | |
|---|---|---|
| EP | 2080649 | 7/2009 |
| JP | 2014069617 A | 4/2014 |

\* cited by examiner

CAB FOR AN AGRICULTURAL WORKING VEHICLE

CROSS-REFERENCE TO RELATED APPLICATIONS

This application claims priority under 35 USC 119 of German Patent Application No. 10 2017 115 126.5, filed on Jul. 6, 2017, the disclosure of which is herein incorporated by reference.

BACKGROUND OF THE INVENTION

The present invention relates to a cab for an agricultural working vehicle having a cab base, a cab body situated thereon and consisting of a frame structure, and a cab roof which comprises at least two shells, and to an agricultural working vehicle comprising a cab.

Cabs for an agricultural working vehicle of the type used in agriculture, forestry, or the construction industry, are a full-fledged workplace which is often utilized by an operator for an entire working day. Examples thereof are tractors, self-propelled harvesting machines such as combine harvesters or forage harvesters, wood harvesting machines, or wheeled loaders.

Since such working vehicles are utilized in highly diverse climatic environmental conditions, the cabs are equipped with an air treatment device which is used for cooling and heating a fresh-air flow fed to the cab.

A cab for a working vehicle is described in EP 2 080 649 B1. The cab comprises a base and a cab roof, between which a windshield and side windows are situated, which are accommodated by a frame structure and provide an all-around view for the operator. A driver's seat is situated on the base of the cab. Situated in the cab roof of the cab is an air treatment device for cooling and heating a fresh-air flow which can be supplied from outside the cab through an intake duct situated in the cab roof by means of at least one fan. The assembly and the installation of the cab roof takes place on the frame structure, wherein work must be performed overhead, which is not ergonomic.

SUMMARY OF THE INVENTION

It is therefore an object of the invention to provide a cab for an agricultural working vehicle, which avoids the disadvantages of the related art.

This problem is solved for a cab, according to the invention, by a cab for an agricultural working vehicle, which comprises a cab base, a cab body situated thereon and consisting of a frame structure, and a cab roof which includes two or more shells. In order to simplify the process of installing the cab, the cab roof is designed as a prefabricated module which can be placed onto the cab body. The prefabrication or preinstallation has the advantage that all assembly and installation work related to the cab roof can be carried out in advance. A more time-intensive and complex overhead installation of the type that has been common so far in the related art, is thereby eliminated. In addition, the number of visible connecting elements of the cab roof and the frame structure can be at least reduced. Connecting elements can be integrated in the upper rear area of the cab, in particular, into components provided there, the type of connecting element depending on the area of application or type of working vehicle on which the cab is utilized. In this way, in the case of an agricultural working vehicle designed as a self-propelled combine harvester or a forage harvester, for example, the connecting elements can be covered in the rear area of the cab by a cover on the closed back wall. In the case of an agricultural working vehicle designed as a tractor, for example, the connecting elements in the upper rear area of the cab can be concealed by the cover of a wiper motor which is mounted on the glass back wall of the cab.

In this case, the frame structure of the cab body can be configured for accommodating, from above, the cab roof which is designed as a module. In addition to the simplification of the installation due to the elimination of the overhead installation as compared to the related art, the design of the cab roof as a preinstalled module has the advantage that no connecting elements, such as screws or the like, are visible in the interior space after the installation of the cab roof.

To this end, the frame structure can comprise circumferentially designed upper frame parts which are provided with fastening points for fixing the cab roof.

In addition, an air treatment device can be situated between the at least two shells of the cab roof, which is designed as a prefabricated module, the air treatment device including slanted contact surfaces which, in the installed position, are flush with complementary contact surfaces. The insertion of the air treatment device into the lower shell results in a form-fit placement of the contact surfaces of the air treatment device against the complementary contact surfaces, whereby a fixation of the air treatment device can be achieved.

In particular, the air treatment device can comprise at least one connector each for the supply and for the discharge of an air flow, the connectors being connectable to corresponding mating connectors in the cab roof, wherein frame elements enclosing the connectors of the air treatment device and frame elements enclosing the mating connectors comprise complementary contact surfaces which are slanted toward the connecting plane. Due to the flush and form-fit abutment, a sealing function, in addition to the fixation, can be simultaneously achieved by the air treatment device itself. In particular, one of the mating connectors can be a first air distribution duct.

The particular contact surfaces can be provided with sealing elements. The contact surfaces are pressed against each other by the weight force of the air treatment device, and therefore no additional supporting means are required.

Yet another embodiment provides that at least one guide groove is situated in at least one of the shells of the cab roof, which is used for the form-fit accommodation of at least one tube, in sections, for discharging condensate. The at least one guide groove is used for guiding the tube, which opens into an A-pillar of the frame structure, in a kink- and compression-free manner, in particular in the transition area from the cab roof into the A-pillar. The preinstallation is simplified as a result. During the installation of the prefabricated cab roof on the frame structure, the guide groove prevents the tube from kinking during connection to the A-pillar, which at least limits a discharge of the condensate.

In addition, the problem mentioned at the outset is solved by an agricultural working vehicle comprising a cab which is designed as described above.

BRIEF DESCRIPTION OF THE DRAWINGS

The present invention is explained in greater detail in the following with reference to exemplary embodiments represented in the drawings.

In the drawings.

DETAILED DESCRIPTION OF THE EMBODIMENTS

Figure 1:
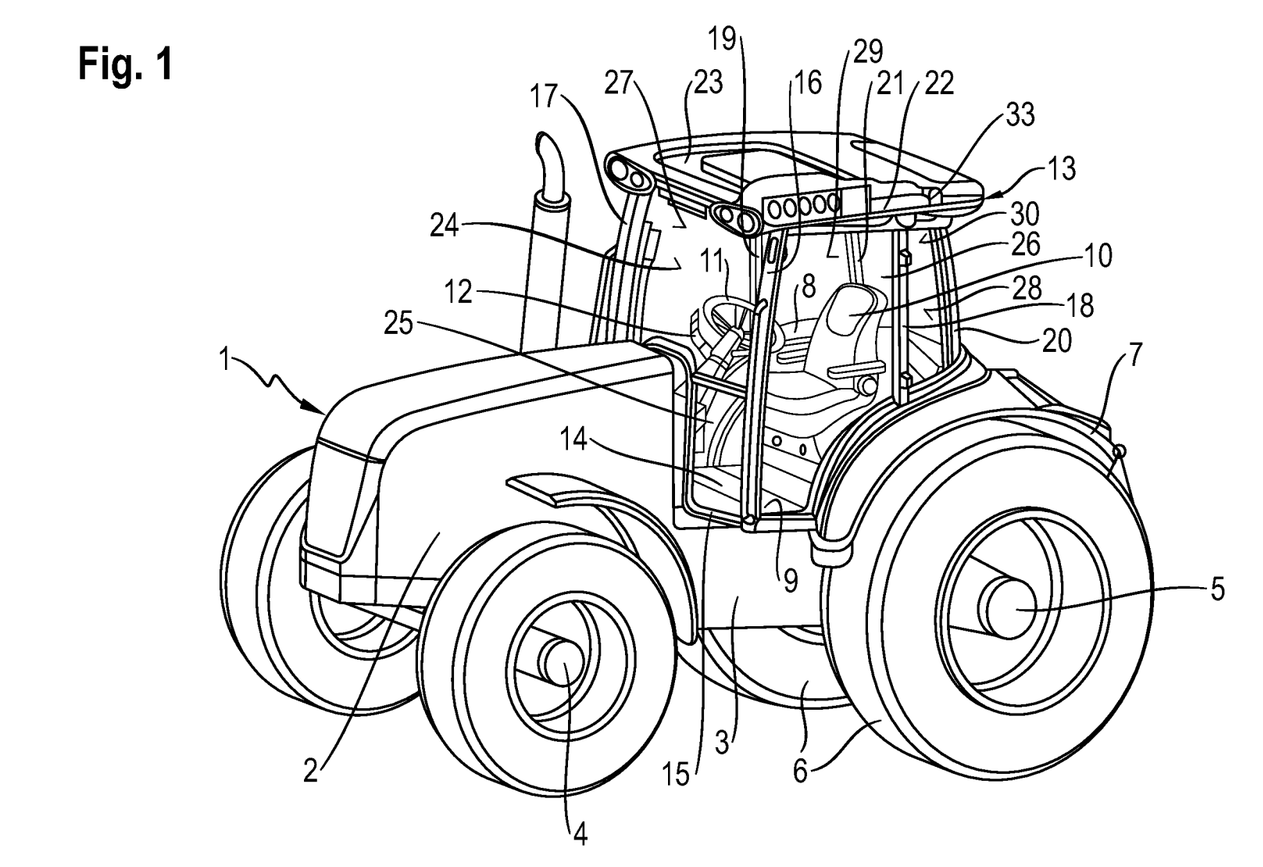
FIG. 1 shows a working vehicle designed as an agricultural tractor.

FIG. 1 shows a working vehicle which is designed as an agricultural tractor 1 and is formed in monobloc design. In this case, an engine housing 2 of an internal combustion engine of the tractor 1 is connected to a transmission and rear axle housing 3. In its front area, the tractor 1 comprises a front axle 4 which is fastened to the engine housing 2 via a front axle housing which is not represented in greater detail. In the rear area of the tractor 1, two wheel axles extend away from the transmission and rear axle housing 3, only one wheel axle 5 of which is visible in the representation according to FIG. 1. The wheel axles drive rear wheels 6 which are covered over a portion of their outer circumference by fenders 7 and 8 on both sides of the tractor 1, wherein the fenders 7 and 8 can be integrally formed with an operator's platform 9. Situated on this operator's platform 9, which is integrally formed with the fenders 7 and 8, are, inter alia, a driver's seat 10, a steering device 11, and a display and control unit 12. It lies within the scope of the invention that the working vehicle can also be a self-propelled combine harvester or forage harvester, as well as any other type of agricultural, forestry, or municipal commercial vehicle comprising a cab.

A driver's cab 13 of the tractor 1 forms, with the operator's platform 9, a unit which is mounted in a resilient and vibration-damping manner with respect to the transmission and rear axle housing 3 supporting this unit, via elements which are not represented in greater detail. Therefore, a cab base 14 is formed by the operator's platform 9, and lower frame parts 15 of the driver's cab 13 partially surround the cab base 14 and are guided in other areas above the fenders 7 and 8. Extending away from the lower frame parts 15, in the front area of the driver's cab 13, are substantially vertically extending A-pillars 16 and 17, spaced apart from which B-pillars 18 and 19 and, finally, at the rear of the driver's cab 13, rear pillars 20 and 21 extend.

The pillars 16 to 21 are connected to each other at their upper ends via upper frame parts 22, wherein these upper frame parts 22 are circumferentially formed and accommodate a cab roof 23 designed as a prefabricated module. As is also shown in FIG. 1, the driver's cab 13 is glazed all-around, i.e., the driver's cab comprises a windshield 24 and front windshield parts 25 which are separated from the windshield by transverse frames and are located in the footwell. In addition, a glazed cab door 26 and 27 is provided on each of the two sides of the driver's cab 1, as shown in the perspective representation, each of which is pivotably mounted on the B-pillar 18 and 19, respectively, and abuts the A-pillar 16 and 17, respectively. Located behind the glazed cab doors 26 and 27 are side windows 28 and 29 which are located between the B-pillar 18 and 19, respectively, and the rear pillar 20 and 21, respectively. Finally, the driver's cab 13 is closed on its rear side, i.e., in the area located between the rear pillars 20 and 21, by a rear window 30 which can extend up to the cab base 14 in order to improve the view of working devices mounted in the rear area of the cab 13.

Figure 2:
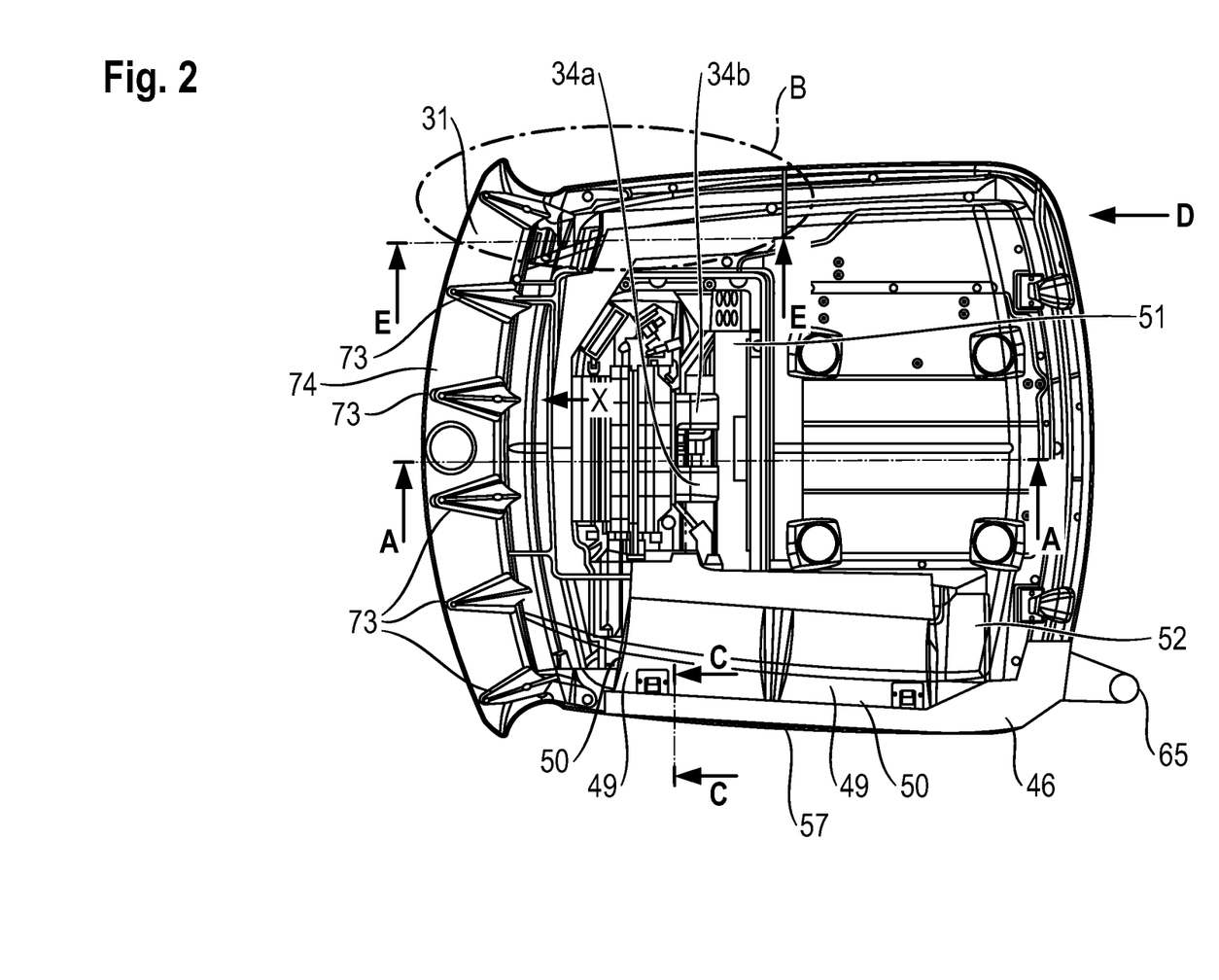
FIG. 2 shows a view of a cab roof of a working vehicle from below.

FIG. 2 shows the cab roof 23 in a view from below, wherein an upper shell 32 limiting the cab roof 23 is represented transparently for the sake of improved clarity.

Figure 3:
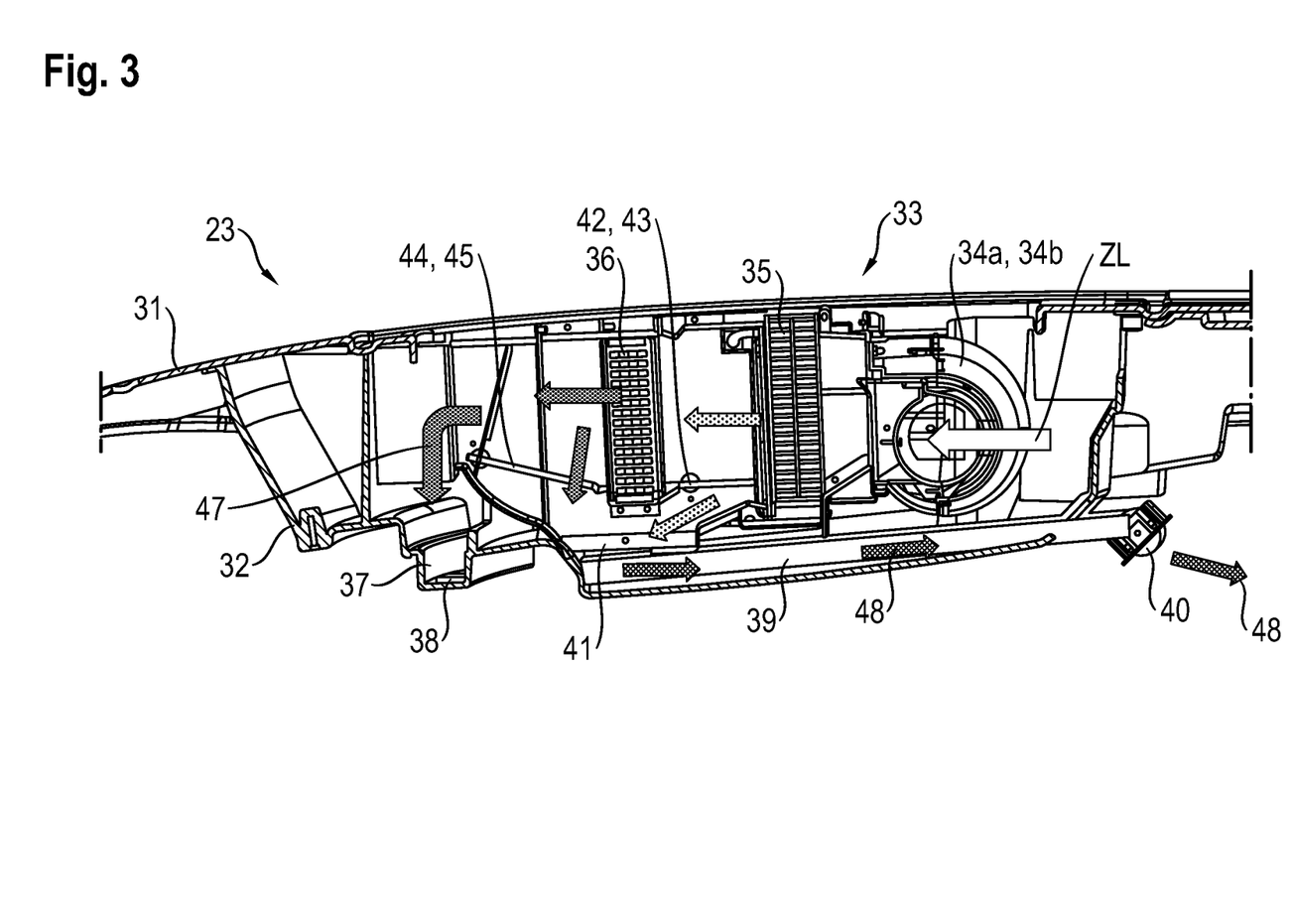
FIG. 3 shows a longitudinal sectional view along the line A-A according to FIG. 2 of the cab roof.

In FIG. 3, a longitudinal sectional view of the cab roof 23 along the line A-A according to FIG. 2 is represented. The cab roof 23 comprises at least two shells, i.e., an upper shell 31 and a lower shell 32. In the exemplary embodiment represented, an air treatment device 33 is situated between the upper shell 31 and the lower shell 32. An arrangement of an air treatment device deviating therefrom is conceivable, for example, in the area outside the cab roof 23. The air treatment device 33 comprises at least one fan 34a and 34b, a cooling device 35, and a heating device 36. Preferably, two fans 34a, 34b are provided, which feed an inlet air flow ZF to the cooling device 35. FIG. 3 shows a view of the cab roof 23 from above, wherein the upper shell 31 is transparently represented. The inlet air flow ZL is drawn through an intake duct 46 and is fed to the fans 34a, 34b, as indicated in FIG. 3. The inlet air flow ZL flows through the cooling device 35 and subsequently reaches the heating device 36 which is spaced apart from the cooling device. A first bypass 42 is situated between the cooling device 35 and the heating device 36. The bypass 42 comprises a flow-limiting element designed as a flap 43. In a simpler embodiment of the first bypass 42, the volumetric flow of cooled inlet air to be branched off can be limited by at least one flow-limiting element which is designed as a restrictor or a throttle. The volumetric flow of cooled inlet air that is not branched off from the first bypass 42 flows through the heating device 36. Disposed downstream from the heating device 36 is a second bypass 44. The second bypass 44 is designed as a flap 45. The volumetric flow which emerges from the heating device 36 and is guided past the second bypass 44 forms a first air flow 47 which is fed to a first air distribution duct 37. The first air distribution duct 37 has a substantially U-shaped course. In this case, approximately parallel subsections of the first air distribution duct 37 extend at least in sections in the longitudinal direction of the cab 13 between the particular A-pillar 16 and 17 and the particular B-pillar 18 and 19, respectively, or the corresponding rear pillar 20 or 21, respectively. A transversely extending subsection of the first air distribution duct 37 extends substantially across the width of the cab 13 in the area of the windshield 24. The first air distribution duct 37 comprises first air outlet openings 38. The first air flow 47, which is directed downward and flows substantially along the windshield 24, emerges from the first air outlet openings 38.

The partial volumetric flow, which has branched off downstream from the cooling device 35 via the first bypass 42, circumvents the heating device 36 and enters a mixing zone 41 located downstream from the heating device 36. A partial volumetric flow of the inlet air flow ZL heated by the heating device 36, which has been branched off by the second bypass 44, is introduced into this mixing zone 41. The two partial volumetric flows form a second air flow 48 which is fed to a second air distribution duct 39. The second air distribution duct 39 comprises second air outlet openings 40 which open into the interior of the cab 13. The second air flow 48, which is directed in the direction of the driver's seat 10, emerges from the second air outlet openings 40.

There is a temperature difference between the first air flow 47 and the second air flow 48, wherein the first air flow 47 has a higher temperature than the second air flow 48. This has the effect that the second air flow 48 can be utilized, on the one hand, for defrosting at least the windshield 24 as well as for supplying warmer air in the area of the cab base 14 than in the area of the driver's seat 10, which is located higher up. Preferably, the temperature difference between the second air flow 48 when emerging from the second air outlet openings and the first air flow 47 when reaching the cab base 14 lies in a range which is generally perceptible by an operator without technical auxiliary means. In this way, a temperature distribution in the cab 13 is achieved, which is perceived by an operator as being particularly comfortable. Both the flap 43 and the flap 45 can be controlled in a temperature-dependent manner, for example, in order to change the branched-off partial volumetric flows which are combined to form the second air flow 48.

The inlet air flow ZF is drawn in through the intake duct 46 by the fans 34a, 34b and is fed to at least one filter element designed as an air filter 49, as represented in FIG. 2. The air filter or filters 49 is/are situated in the accommodating sections 50 in the cab roof 23. The air filters 49 are designed as pocket filters. Instead of the pocket filters, category 4 filter elements can also be inserted into the accommodating sections 50; such filters must be utilized when pesticides, for example, are to be applied by the working vehicle 1. A circulating air filter 51 is situated so as to lie substantially transversely to the windshield 25. The circulating air filter 51 filters air drawn out of the cab 13 before this air is returned to the air treatment device 33 as circulating air.

A vent flap 52 is situated adjacent to the intake duct 46 and fluidically connects the interior of the cab 13 to the intake duct 46. The vent flap 52 can be actuated on only one side and opens when an overpressure abruptly occurs in the interior of the cab 13, which is induced by the cab door 26 being closed. The air flow escaping through the vent flap 52 travels through the intake duct 46 and reaches the air filters 49. The abruptly occurring air pressure difference sets the air filters 49 into motion or vibration. In this way, a cleaning effect can be achieved, in that particles that have deposited on the walls of the air filter 49 are detached by way of the motion. The intake duct 46 is simultaneously utilized for ventilation.

The representation in FIG. 2 also shows that the upper shell 31, opposite the transparently represented lower shell 32, comprises, on one side, a flat overhang 74 extending across the width of the cab roof 23. The overhang 74 bears, with respect to the lower shell 32, on the lower shell by means of at least two profiled elements 73 which are spaced apart from each other. The profiled elements 73 are designed to be substantially tetrahedral or as 3D ribs in order to reduce the weight while simultaneously maintaining or improving the stability.

Figure 4:
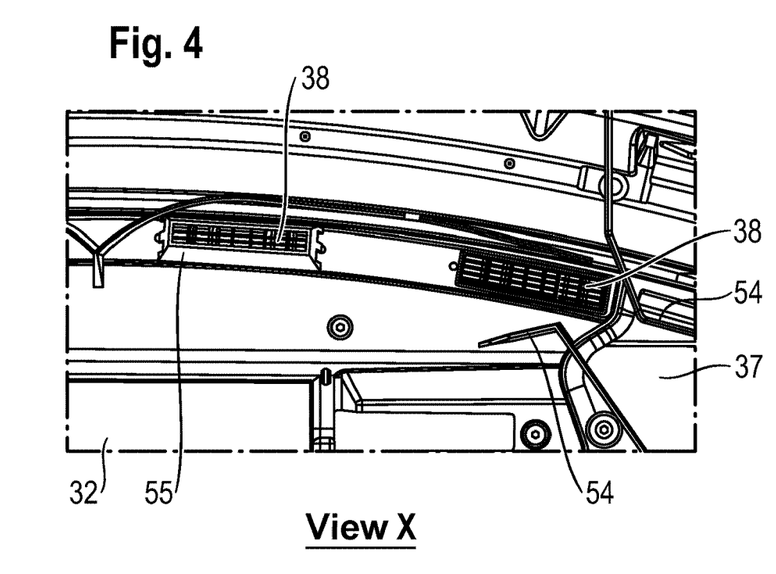
FIG. 4 shows a partial view X according to FIG. 2 of a lower shell.
Figure 5:
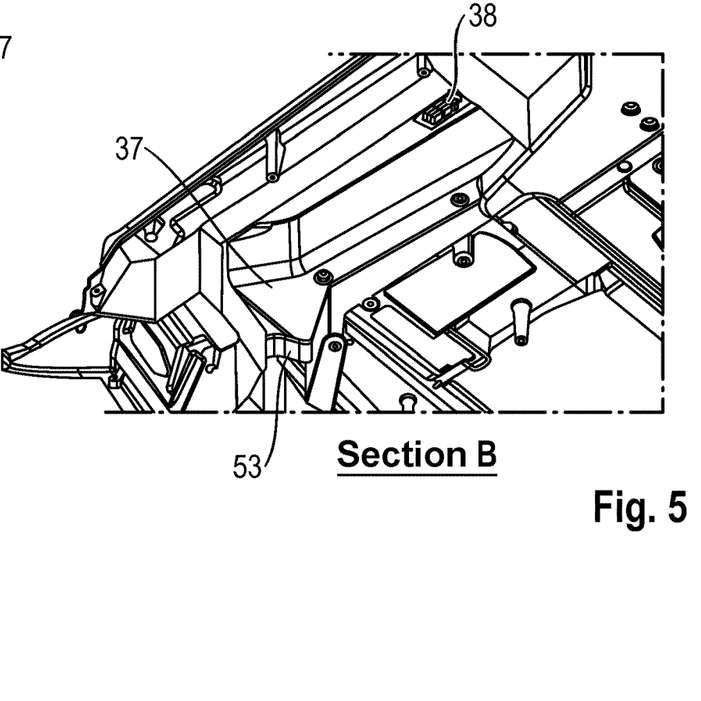
FIG. 5 shows a perspective view of a section B according to FIG. 2 of the cab roof.

Since the inlet air flow ZL is drawn in on only one side, a greater proportion of cold inlet air is fed by the fan 34a, which is situated closer to the intake duct 46, than by the fan 34b which is spaced farther away from the intake duct 46. In order to achieve a homogeneous distribution of the first air flow 47 flowing out of the first air outlet openings 38, means are provided, at least in the first air distribution duct 37, for fluidically influencing the first air flow 47, which is represented in FIGS. 4 and 5. In this case, the representation in FIG. 4 shows a detailed view X according to FIG. 2. A section B according to FIG. 2 is represented in FIG. 5. The means are ribs 53, baffles 54, angles of the baffles 54 or the side walls of the first air distribution duct 37, or any other components influencing the flow behavior, such as a partially open housing 55 which surrounds the first air outlet opening 38 in sections. A variation of individual cross sections of the first air distribution duct 37 is also significant in terms of influencing the flow.

Figure 6:
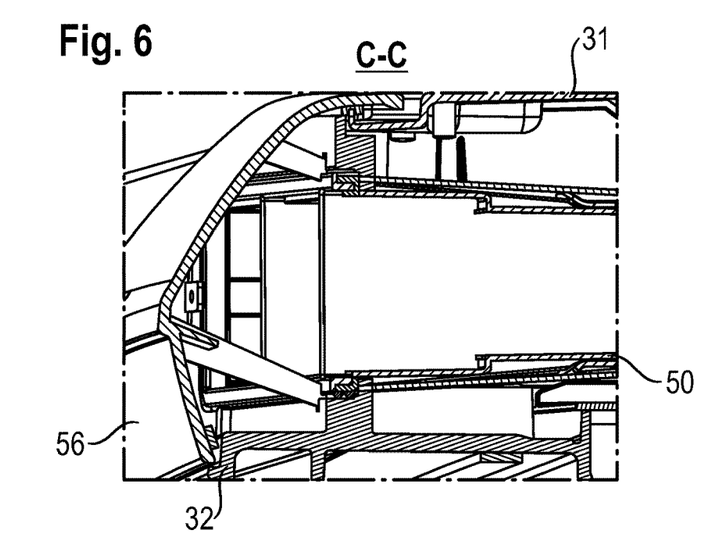
FIG. 6 shows a partial sectional view of the cab roof along the line E-E according to FIG. 2 including an accommodating section for an air filter.

FIG. 6 shows a partial sectional view of the cab roof 23 along the line C-C according to FIG. 2, which shows the accommodating section 50 for one of the air filters 49. The accommodating section 50 extends substantially horizontally between the upper shell 31 and the lower shell 32.

Figure 7:
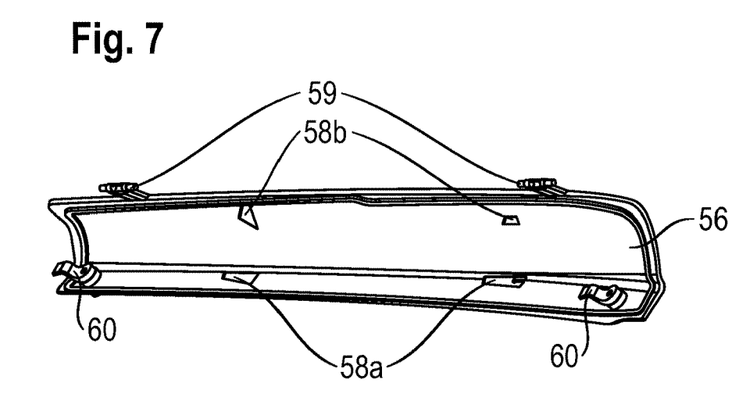
FIG. 7 shows a perspective view of a cover element closing the accommodating section.

FIG. 7 shows a cover element 56 which closes the accommodating section 50. The cover element 56 is detachably situated on a circumferential side wall 57 formed between the upper shell 31 and the lower shell 32. In the mounted position, the cover element 56 closes so as to be flush with the circumferential side wall 57. The cover element 56 comprises fastening sections 59 in order to be fastened on the upper shell 31, the fastening sections allowing the cover element 56 to pivot upward in the direction of the upper shell 31. Fastening elements 60 are provided for the detachable connection of the cover element 56 to the lower shell 32. The cover element 56 comprises, on its inner side, at least two pair of webs 58a, 58b which extend, in sections, in the direction of the accommodating section 50. The webs 58a, 58b of one pair have different lengths, which is due to the outwardly curved contour of the cover element 56. The length of the webs 58a, 58b is sized in such a way that, when an air filter 49 is installed in the accommodating section 50, the webs 58a, 58b bear on the frame of the air filter 49 and fix the air filter in the accommodating section 50, wherein the cover element 56 simultaneously closes flush with the circumferential side wall 57. If the filter element 49 were not correctly inserted into the accommodating section 50, the cover element 56 would not be able to close flush with the circumferential side wall 57.

Figure 8:
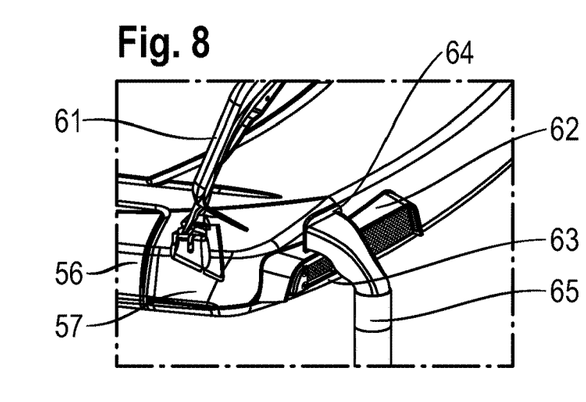
FIG. 8 shows a partial view of the cab roof obliquely from the rear, including a filter tube to be installed.
Figure 9:
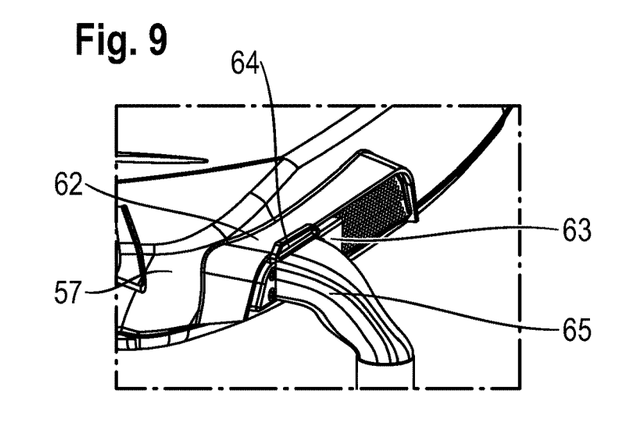
FIG. 9 shows a partial view of the cab roof 23 obliquely from the rear with the filter tube installed.

A partial view of the cab roof 23 obliquely from the rear is represented in FIGS. 8 and 9. A roof side element 61 is pivotably articulated on the circumferential side wall 57 and can be transferred out of a position which is substantially parallel to the upper shell 31 into a position which is slanted at an angle with respect to the upper shell 31. The latter slanted position of the roof side element 61 is represented in FIG. 8. On the back side of the cab roof 23, the circumferential side wall 57 comprises a section 62 including air supply openings 62a which are adjoined by the intake duct 46. An accommodating element 63 which is designed open toward the top side of the cab roof 23 is situated at the section 62. A flange-shaped connecting element 64, which is situated on a tubular filter element 65, at the end thereof, can be inserted into the accommodating element 63 from above in a form-fit manner. The tubular filter element 65 situated on the outside of the cab 13 is used for the pre-filtration of large pieces of debris out of the air that is drawn in, whereby the useful life of the air filter 49 is extended. To this end, the form-fit connection between the accommodating element 63 and the connecting element 64 is designed as a dovetail joint. In order to connect or disconnect the tubular filter element 65, the operator need only swivel the roof side element 61 upward. Subsequently, the operator can insert or slide the connecting element 64 in the vertical direction into the accommodating element 63. When the roof side element 61 is swiveled downward and the tubular filter element 65 is installed, the connecting element 64 is prevented from sliding out of the accommodating element 63.

Figure 10:
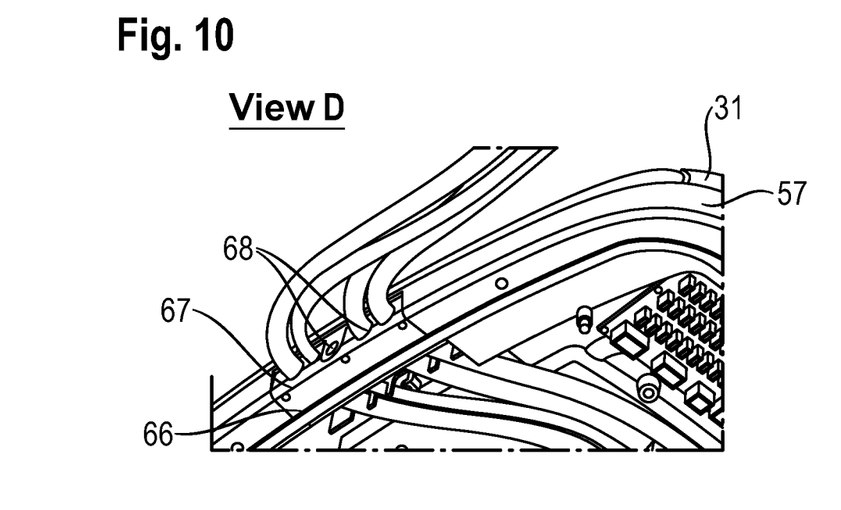
FIG. 10 shows a perspective partial view D according to FIG. 2 of the cab roof obliquely from the rear, including a wall insert.
Figure 11:
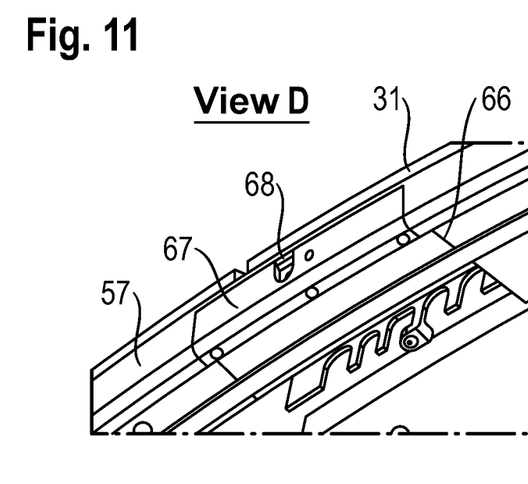
FIG. 11 shows a perspective partial view D according to FIG. 2 of the cab roof obliquely from the rear, including a wall insert according to yet another embodiment.

FIGS. 10 and 11 show a perspective partial view D according to FIG. 2 of the cab roof 23 from the rear. A recess 66 is situated in the circumferential side wall 57. The recess 66 is uniformly sized for cab roofs 23 or cabs 13 which are to be utilized for different working vehicles 1, such as tractors, self-propelled combine harvesters, or forage harvesters. A wall insert 67, which is provided with at least one passage opening 68, is inserted into the recess 66 and closes the recess 66. FIG. 10 shows a first embodiment of the wall insert 67 comprising multiple passage openings 68. FIG. 11 shows a second embodiment of the wall insert 67 comprising only one passage opening 68. The number and the configuration of the passage openings 68 of the particular wall insert 67 depend on the particular type of working vehicle 1.

Figure 12:
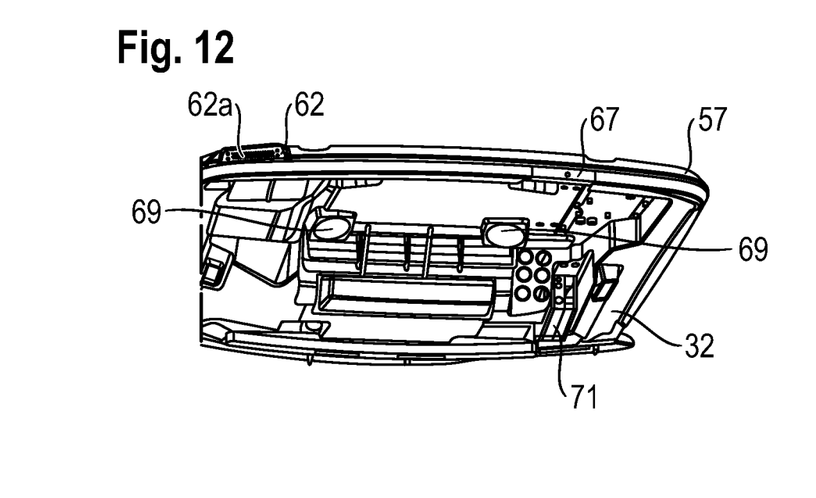
FIG. 12 shows a perspective partial view of the cab roof obliquely from below.
Figure 13:
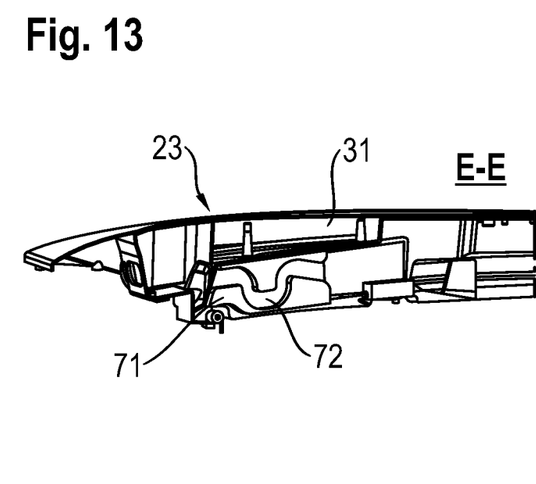
FIG. 13 shows a partial view of the cab roof in the longitudinal section along the line E-E according to FIG. 2.

A perspective partial view of the cab roof 23 from below is represented in FIG. 12. Multiple hollow-cylindrical sections 69 comprising a closed lateral surface are situated between the lower shell 32 and the upper shell 31. The hollow-cylindrical sections 69 can have cross-sectional shapes which are identical or which differ from each other. A base surface 70 of the particular hollow-cylindrical section 69, which is designed to be open and which opens into the lower shell 32, can be sealingly closed by means of a loudspeaker diaphragm. The hollow-cylindrical sections 69, each of which is closed by the loudspeaker diaphragm, form a resonance body. The volumes of the hollow-cylindrical sections 69 can each be changed by a volume-limiting elements. In addition, the representation in FIG. 12 shows that the interior of the cab 13 is fluidically permanently connected to the surroundings by means of a ventilation duct 71 situated in the cab roof 23. The ventilation duct 71 comprises a section 72 having a substantially U-shaped course, which is represented in greater detail in FIG. 13 in the partial view of the cab roof 23 in the longitudinal section along the line E-E according to FIG. 2.

Figure 14:
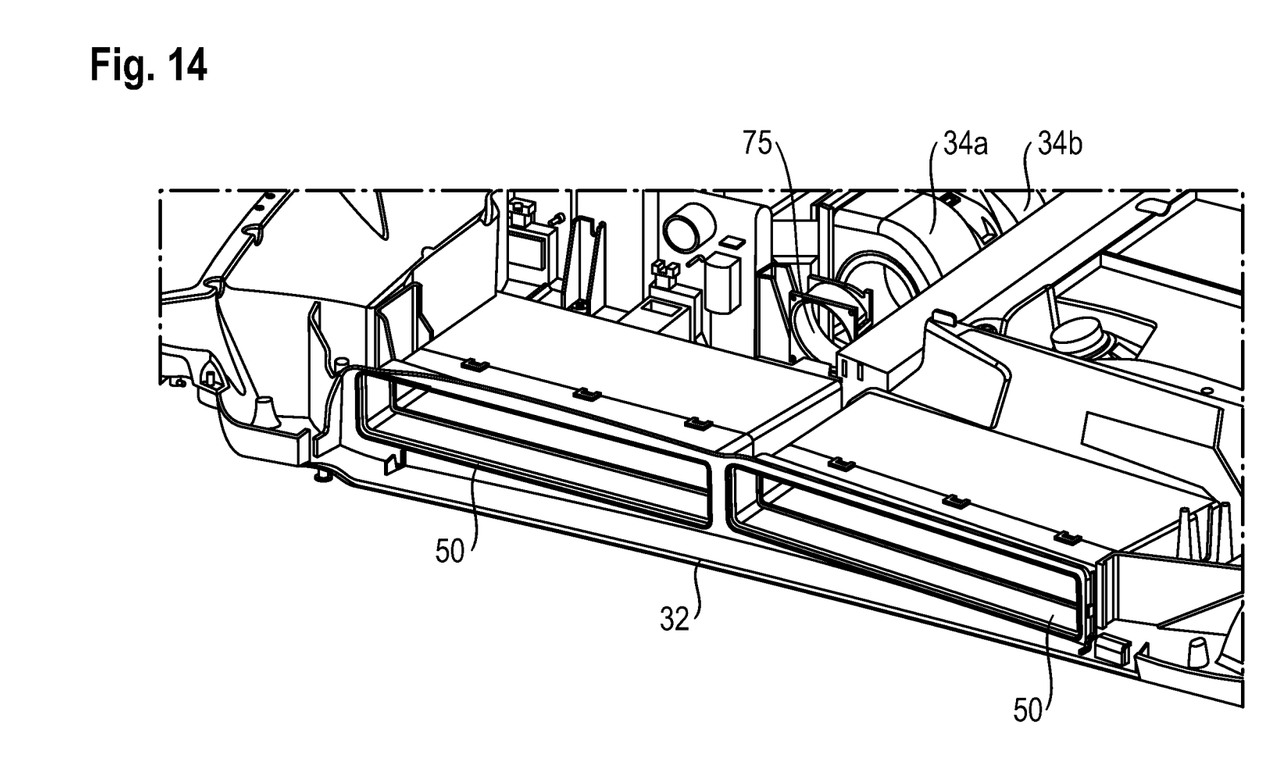
FIG. 14 shows a perspective partial view of the cab roof from the side.

The representation in FIG. 14 shows a perspective partial view of the cab roof 23 from the side. The accommodating sections 50 are represented without air filters 49 inserted. The circulating air filter 51 can be pulled outward through the exposed front accommodating section 50. This arrangement has the advantage that the circulating air filter 51 need not be emptied inwardly, into the cab, as is common in the related art, but rather outwardly. Due to the removal of the horizontally situated circulating air filter 51 toward the outside, the situation is avoided in which particles taken up by the filter trickle out.

An additional fan 75 is situated adjacent to the fans 34a and 34b. The additional fan 75 is used for compensating for the increased demand for inlet air during a replacement of the air filters 49, which are designed as pocket filters, by filter elements, for example of category 4 or lower, which are accommodated by the accommodating sections 50 and are fixed by the cover element 56 in the same way. To this end, the different filter elements are designed as modules which are adapted to the accommodating sections 50, and therefore ease of replacement is ensured.

Figure 15:
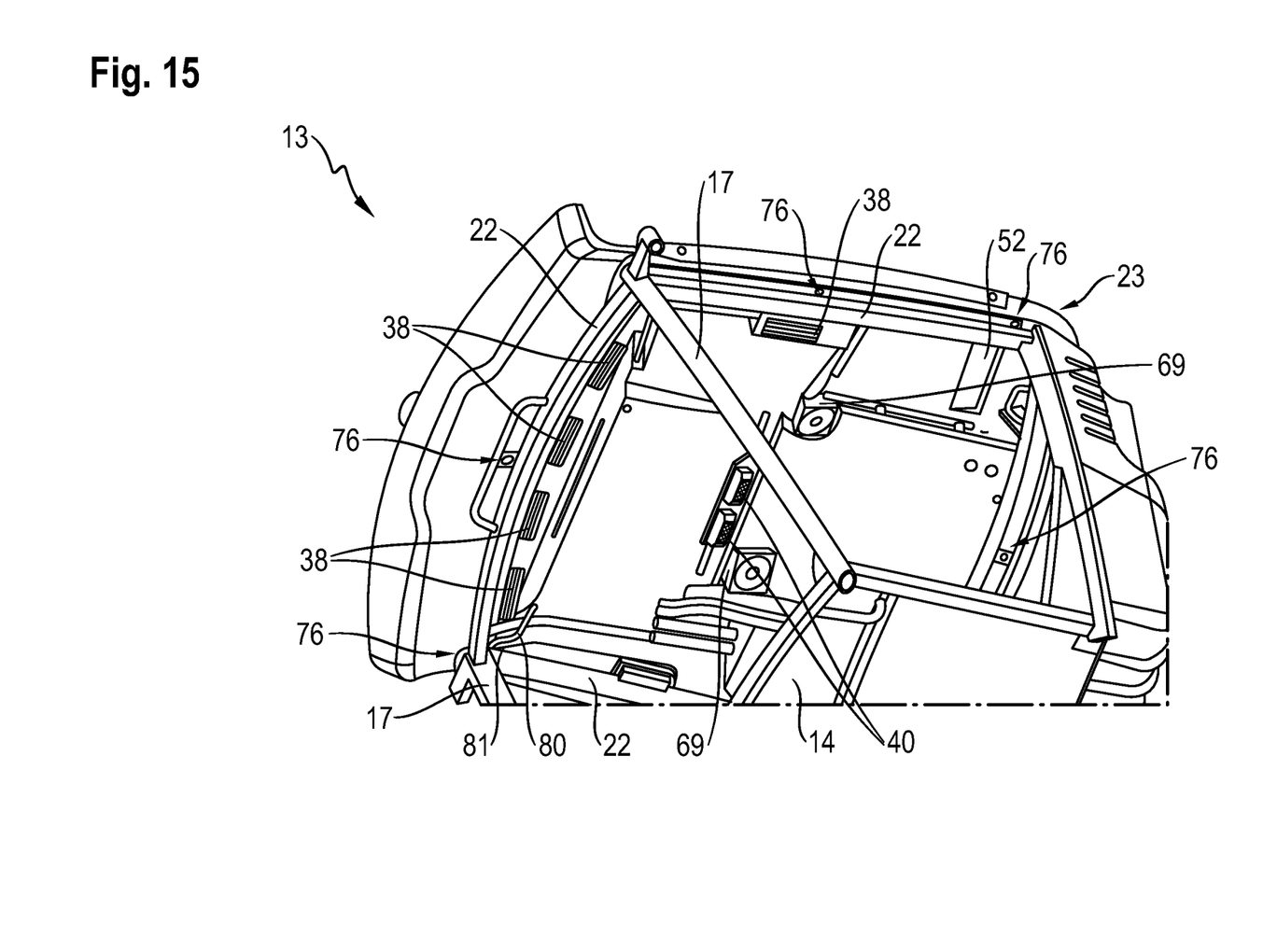
FIG. 15 shows a perspective view of the cab obliquely from below.

A perspective view of the cab 13 obliquely from below is represented in FIG. 15. The cab roof 23 is designed as a prefabricated module which can be mounted on the frame structure of the cab 13. To this end, the upper, circumferentially designed frame parts 22 comprise multiple fastening points 76, onto which the preassembled cab roof 23 can be placed. "Preassembled" and "prefabricated" mean that all components necessary for the operation of the air treatment device 33 have been situated between the upper shell 32 and the lower shell 33 in an upstream production step. The lower shell 33 is covered by a roof liner situated thereon.

As is clear from FIG. 15 in particular, the first air outlet openings 38 and the second air outlet openings 40 are installed exclusively in the cab roof 23. In this case, multiple first air outlet openings 38 are situated next to each other in the area of the windshield 24. The air inlet openings discharge the first air flow 47 which is directed from top to bottom and flows substantially along the windshield 24 to the cab base 14, i.e., into the foot area of the operator. The second air outlet openings 40 situated above the driver's seat 10 discharge the second air flow 48 which is directed onto the head area of the operator. As described above, there is a temperature difference between the warmer first air flow 47 and the cooler second air flow 48, which can be perceived by the operator without auxiliary means, in order to achieve a temperature distribution or temperature stratification which is perceived by the operator as being pleasant.

In order to influence the temperature distribution, the addition of inlet air cooled by the cooling device 35 can be controlled by means of the flap 43. The flap 43 can be adjusted by means of a servomotor which, in turn, can be controlled by an additional temperature sensor.

Situated in the lower shell or the upper shell of the cab roof is at least one guide groove 81 which is used for the form-fit accommodation, in sections, of at least one tube 80 for discharging condensate. The at least one guide groove 81 makes it possible to guide the tube, which opens into an A-pillar 17 of the frame structure, in a kink- and compression-free manner, in particular in the transition area from the cab roof into the A-pillar 17. The preassembly is facilitated in this way, wherein, during the installation of the prefabricated cab roof 23 on the frame structure, the guide groove 81 prevents the tube 80 from kinking during connection to the A-pillar 17, which at least limits a discharge of the condensate.

Figure 16:
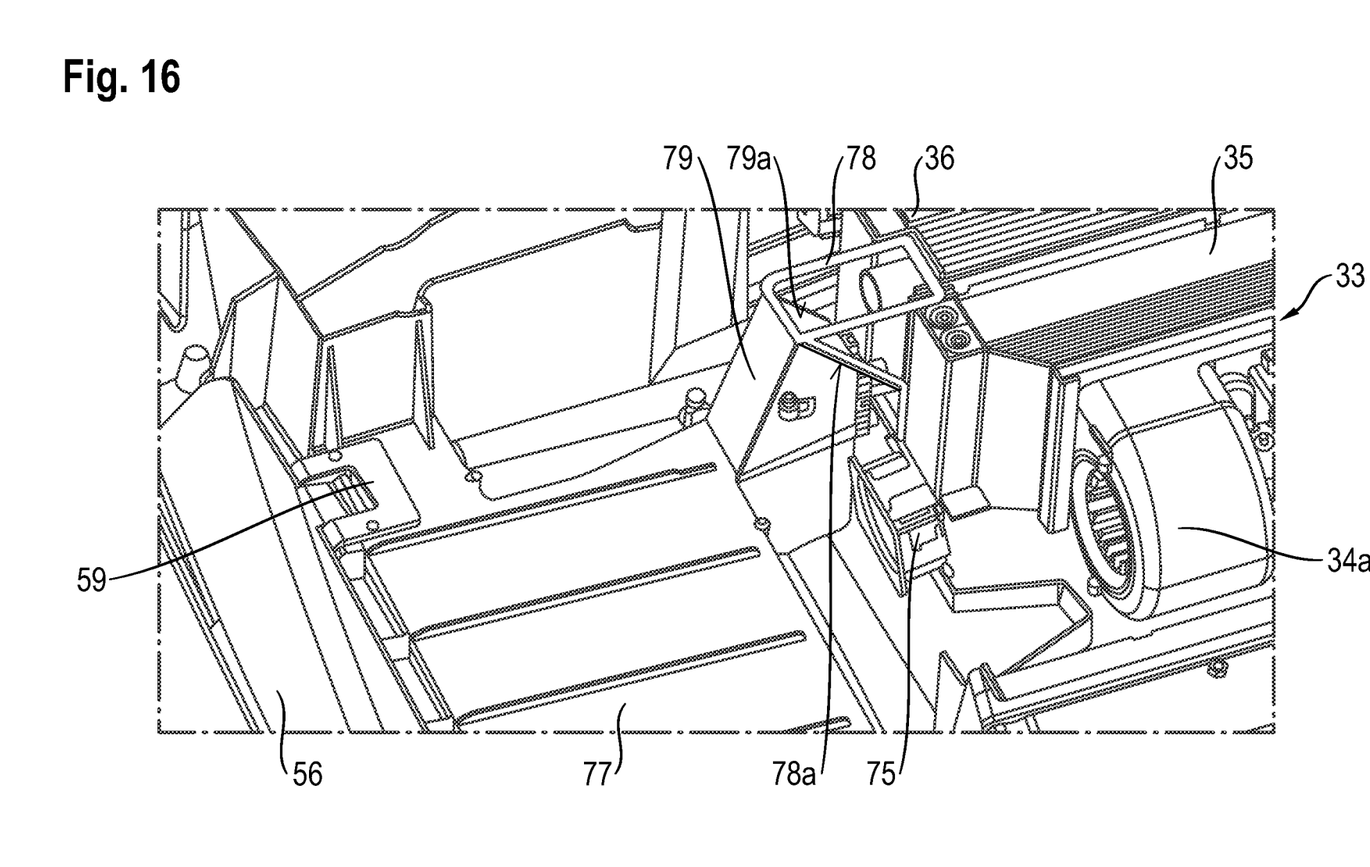
FIG. 16 shows a perspective partial view of the lower shell from above.

A perspective partial view of the lower shell 32 from above is represented in FIG. 16. The air treatment device 33 comprises at least one connector 77 which is connected to a corresponding mating connector 78. The mating connector 78 feeds a cooled air flow to a roof cooling compartment 76 integrated into the cab roof 23. The connector 77 as well as the mating connector 78 comprise slanted contact surfaces 77a, 78a, respectively. The contact surfaces 77a and 78a are designed to be complementary to each other, and therefore the insertion of the air treatment device 33 simultaneously results in a sealing connection of the at least one connector 77 to the mating connector 78. The air treatment device 33 can also be designed to include slanted contact surfaces in the area of the first air distribution duct 37, and therefore a sealing can be achieved here as well during the installation of the air treatment device 33.

LIST OF REFERENCE SIGNS 1 tractor
2 engine housing
3 transmission and rear axle housing
4 front axle
5 wheel axle
6 rear wheel
7 fender
8 fender
9 operator's platform
10 driver's seat
11 steering device
12 control unit
13 driver's cab
14 cab base
15 frame part
16 A-pillar
17 A-pillar
18 B-pillar
19 B-pillar
20 rear column
21 rear column
22 frame part
23 cab roof
24 windshield
25 windshield part
26 cab door
27 cab door
28 side window
29 side window
30 rear window
31 upper shell
32 lower shell
33 air treatment device
34a fan
34b fan
35 cooling device
36 heating device
37 first air distribution duct
38 first air outlet opening
39 second air distribution duct
40 second air outlet opening
41 mixing zone
42 first bypass
43 flap
44 second bypass
45 flap
46 intake duct
47 first air flow
48 second air flow
49 air filter
50 accommodating section
51 circulating air filter
52 ventilation flap
53 rib
54 baffle
55 housing
56 cover element
57 side wall
58a web
58b web
59 fastening section
60 fastening element
61 roof side element
62 section
63 accommodating element
64 connecting element
65 tubular filter element
66 recess
67 wall insert
68 passage opening
69 hollow-cylindrical section
70 base surface of 69
71 ventilation duct
72 U-shaped section
73 profiled element
74 overhang
75 additional fan
76 fastening point
77 roof cooling compartment
78 connector
78a contact surface
79 mating connector
79a contact surface
80 tube
81 guide groove
ZL inlet air

What is claimed is:

1. A cab for an agricultural working vehicle, comprising:
    a cab base;
    a cab body situated on the cab base and consisting of a frame structure;
    a cab roof which comprises at least two shells, the cab roof being designed as a prefabricated module that is configured to placed onto the cab body; and
    an air treatment device comprising a fan, a cooling device and a heating device situated between the at least two shells of the cab roof, the air treatment device being designed as a prefabricated module, and comprising slanted contact surfaces which, in an installed position, are flush with complementary contact surfaces.

2. The cab as claimed in claim 1, wherein the frame structure of the cab body is configured for accommodating the cab roof, which is designed as a module, from above.

3. The cab as claimed in claim 2, wherein the frame structure comprises circumferentially designed, upper frame parts which are provided with fastening points configured for fixing the cab roof.

4. The cab as claimed in claim 1, wherein the air treatment device comprises at least one connector each for supply and for discharge of an air flow, the connectors being connectable to corresponding mating connectors in the cab roof, wherein frame elements enclosing the connectors of the air treatment device and frame elements enclosing the mating connectors comprise the complementary contact surfaces.

5. The cab as claimed in claim 1, wherein the contact surfaces of the air treatment device are provided with sealing elements.

6. The cab as claimed in claim 1, wherein at least one guide groove is arranged in at least one of the shells of the cab roof said guide groove forming a form-fit accommodation in sections of at least one tube for discharging condensate.

7. The agricultural working vehicle comprising the cab as claimed in claim 1.

* * * * *